UNITED STATES PATENT OFFICE.

FRIEDRICH PICH, OF BERLIN, GERMANY.

METHOD OF HARD-SOLDERING CAST-IRON.

SPECIFICATION forming part of Letters Patent No. 647,631, dated April 17, 1900.

Application filed March 21, 1898. Serial No. 674,697. (No specimens.)

*To all whom it may concern:*

Be it known that I, FRIEDRICH PICH, engineer, a subject of the German Emperor, residing at 41 Haidestrasse, Berlin, in the German Empire, have invented certain new and useful Improvements in Methods of Hard-Soldering Cast-Iron, &c., (for which I have filed applications as follows: in Austria, February 23, 1898; in Hungary, February 26, 1898; in Belgium, February 28, 1898; in France, February 23, 1898; in Great Britain, February 23, 1898; in Denmark, February 23, 1898; in Norway, February 26, 1898; in Sweden, March 4, 1898; in Italy, March 6, 1898; in Luxemburg, February 22, 1898; in Spain, March 17, 1898; in Russia, April 9, 1898, and in Germany, December 6, 1897;) and I do hereby declare that the following is a description thereof.

While the hard-soldering of wrought-iron with various alloys of copper causes no difficulty, the same cannot be said in regard to the hard-soldering of cast-iron; and my invention therefore consists in a novel or improved process of effecting such hard-soldering of cast-iron.

My improved process is based upon the theory that cast-iron might be hard-soldered in an open smith's fire equally as well as wrought-iron if it were possible to free the cast-iron surfaces to be soldered from graphite during the process and at the same time to bring the molten hard solder into intimate contact with the "red-hot" cast-iron graphite-freed or decarbonized surfaces under exclusion of atmospheric air.

The new process based upon this theory is as follows: The cast-iron surfaces to be soldered are cleaned by means of an acid in the usual way, fixed together, and the soldering-places covered or surrounded with a paste consisting, preferably, of suboxid of copper and borax. This paste is prepared by mixing said suboxid and borax, preferably by boiling them together so intimately that the suboxid of copper is surrounded by a layer of borax-absorbing oxid, which excludes the action of the atmosphere upon the suboxid during the heating process required for soldering. For the borax other suitable fluxes—such as glass or water-glass, &c.—may be substituted. While hard-soldering the cast-iron the borax melts and protects, as is well known, the cleaned surface of the iron against oxidation, removes any oxid thereon, and also protects the suboxid of copper against the action of the oxygen of the atmosphere. Consequently the suboxid of copper, likewise heated to a red heat, transfers its oxygen to the red-hot cast-iron surface, which oxygen combines with the graphite contained in the cast-iron surfaces to form carbon monoxid or dioxid, thus decarbonizing said surfaces, while the metallic copper becomes dissociated in a very finely-divided condition. At the same time the hard solder is added, and as this solder, which is brought upon the surfaces to be soldered in the well-known manner, is likewise melted by the heat it alloys itself with the incandescent particles of copper, and this new alloy immediately combines with the red-hot decarbonized soldering-surfaces of the cast-iron.

The essential features of the new process as above explained are, first, the local decarbonization of the cast-iron by means of a metallic suboxid under the protection of borax or other flux, which performs a double action—viz., a protective action excluding oxygen from the cast-iron as well as from the metallic oxid and an absorbing action on the surplus metallic suboxid—and, second, the formation of a finely-divided metal from the metallic suboxid, which metal forms an alloy with the solder, and thus effects the soldering of the cast-iron.

To the paste made as hereinbefore described finely-powdered decarbonized iron or such iron surrounded by a layer of suboxid may be added, by means of which the soldering is rendered quicker and more uniform.

The suboxid of copper may in some cases be replaced by or mixed with suboxid of iron.

I do not claim herein the particular soldering compound by which I accomplish this brazing of iron, for the reason that I have specifically claimed such compound and the method of forming the same in a separate application made therefore as a division of the original application herein; but so far as this application is concerned I consider that the use of a soldering compound containing any finely-comminuted form of copper which may be deposited on the iron as metallic copper by the action of heat or any finely-comminuted form of other metal which in its metallic state has a great affinity for solder and may be merged with iron or like metals and deposited thereon in a metallic state is within the scope of my invention, and I do not limit myself solely to any particular compound or oxid of copper or any particular compound or oxid of any other like metal having an affinity for solder nor to the use of borax as a flux.

What I claim is—

1. The hereinbefore-described method of soldering cast-iron, which consists in decarbonizing the abutting surfaces, depositing metallic copper on such surfaces by the action of heat on a chemical composition containing copper, applied thereto, adding solder, and melting the same.

2. The hereinbefore-described method of soldering cast-iron, which consists in decarbonizing the abutting surfaces, depositing metallic copper thereon while such surfaces are protected from contact with the air, and soldering with a suitable solder.

3. The hereinbefore-described method of soldering metals such as cast-iron, which consists in depositing on the abutting surfaces in a suitable state by the action of heat a metal which has a greater affinity for the solder than the one to be soldered, such metal being applied in a non-metallic state, adding a suitable solder and melting the same.

4. The hereinbefore-described method of soldering metals such as cast-iron, which consists in depositing on the abutting surfaces in a suitable state by the action of heat a metal which has a greater affinity for the solder than the one to be soldered, such metal being applied in a non-metallic state, adding a suitable solder and melting the same, the joint being kept from contact with the atmosphere during the operation.

In testimony that I claim the foregoing as my invention I have signed my name in presence of two subscribing witnesses.

FRIEDRICH PICH.

Witnesses:
EUGEN ZEUNS,
C. H. DAY.